May 25, 1937. J. VISCASILLAS 2,081,373
PROGRESSIVE AND AUTOMATIC CHANGE SPEED MECHANISM
Filed Oct. 12, 1935 2 Sheets-Sheet 1

J. Viscasillas
INVENTOR

By Glascock Downing & Seebold
Attys.

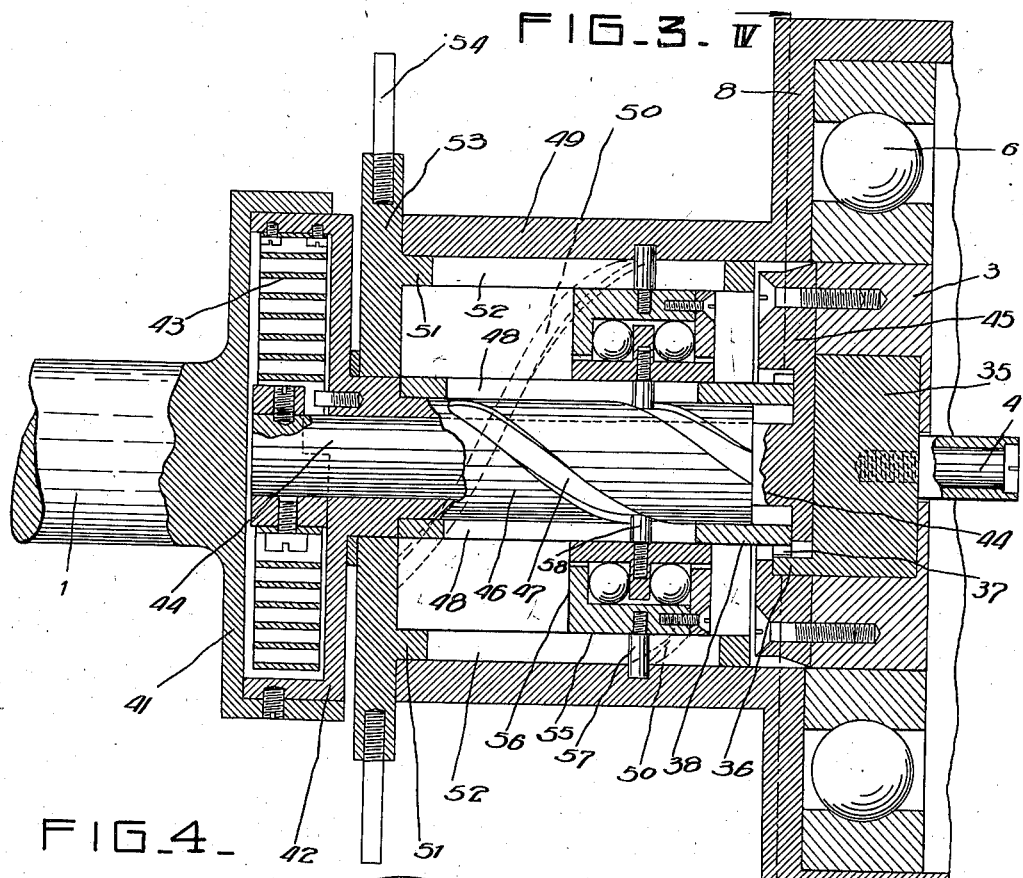
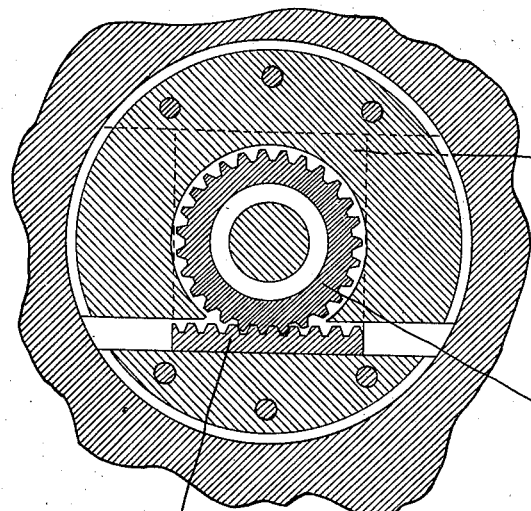

Patented May 25, 1937

2,081,373

UNITED STATES PATENT OFFICE 2,081,373

PROGRESSIVE AND AUTOMATIC CHANGE-SPEED MECHANISM

Jose Viscasillas, Barcelona, Spain, assignor of one-fourth to Joaquin De Robert and one-fourth to Amado Casajuana, both of Barcelona, Spain Application October 12, 1935, Serial No. 44,782
In Spain October 17, 1934

4 Claims. (Cl. 74—117)

My invention relates to a change-speed mechanism which enables the speed ratio between a driving shaft and a driven shaft to be progressively varied in such a way that when the speed of the driving shaft is kept constant, that of the driven shaft can be varied progressively at will or automatically within very wide limits.

The object of my invention is to provide a strong and durable change-speed mechanism in which motion may be transmitted from a driving to a driven shaft with any speed ration that may be desired and without abrupt transitions.

A further object of the invention is to provide a mechanism by which the change of ratio is made automatically and in accordance with the resistances encountered by the driven shaft.

This mechanism comprises essentially a plate or disc permanently fixed to the driving shaft and provided with a crank pin of which the eccentricity or radius is adjustable combined with means for transmitting the movement of this crank pin to the driven shaft, with a velocity which is at all times proportional to the eccentricity of the crank pin.

As the driving shaft rotates the eccentric crank pin describes a circle of variable diameter, and this movement is transmitted by means of pawls to a plate which is integral or virtually integral with the driven shaft, at a velocity proportional to the diameter of the circle that the crank pin is at the moment describing. The variation in the eccentricity of the crank pin may be effected either by hand or automatically and various mechanisms may be utilized for this purpose. For example the crank pin may be mounted upon a guide member provided with a toothed rack, which meshes with a pinion co-axial with the driving shaft, in such a manner that by rotating this pinion the rack is moved and the eccentricity of the crank pin changed. This pinion may be rotated by hand by suitable means, or may alternatively be so arranged that the force is transmitted to the driving shaft through the medium of a spring, and the force of this spring rotates the pinion in each case to a greater or less extent according to the resistance encountered by the driven shaft.

The forms of construction of the mechanism according to the invention are diagrammatically illustrated in the accompanying drawings, in which Figure 1 is a longitudinal section of the constructional form.

Figure 3 is a detail on a larger scale of the mechanism for automatically regulating the eccentricity of the crank pin in relation to the resistance encountered by the driven shaft.

Figure 4 is a section on the line 4—4 in Figure 3.

Figure 1:
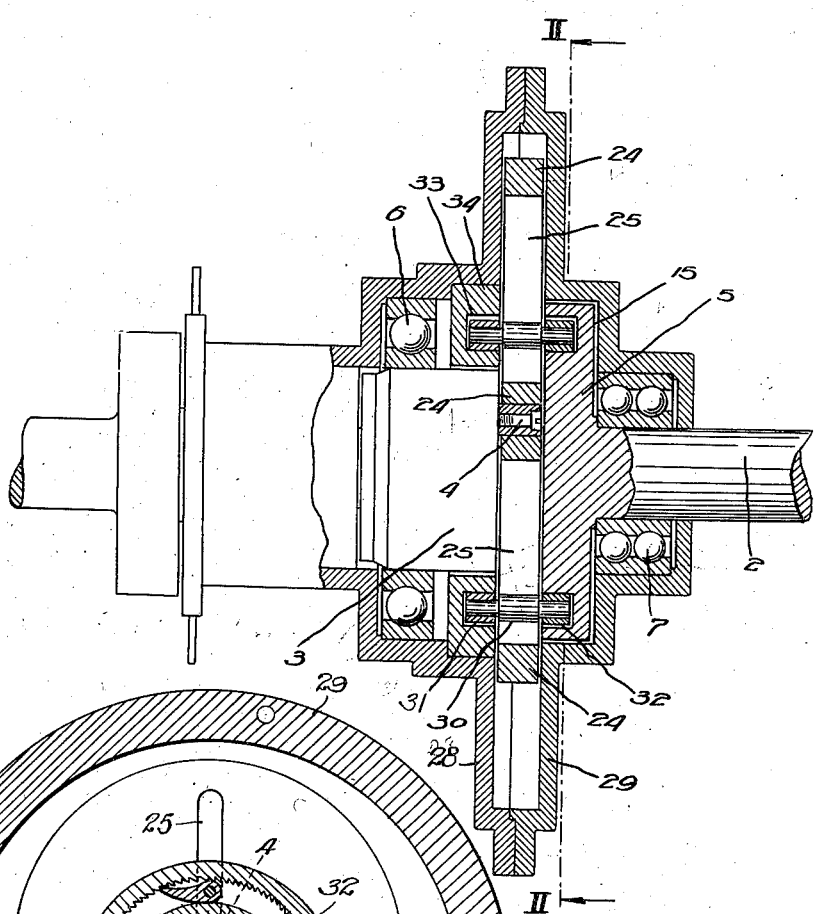
Figure 2:
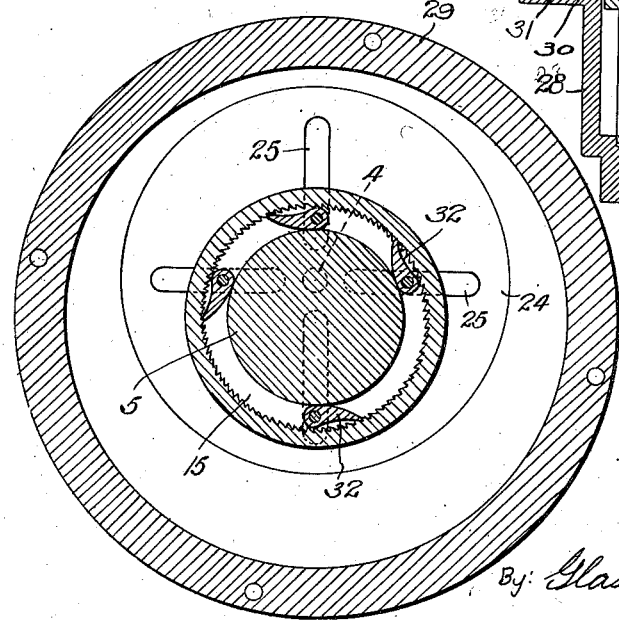
Figure 2 is a cross section of the same on the line 2—2 in Figure 1, the parts of the casing that would obscure the view of certain elements of the mechanism being omitted.

In the form of construction illustrated, the mechanism comprises a driving shaft 1 and a driven shaft 2. The driving shaft 1 terminates in a disc or plate 3, which carries a crank pin 4, the crank radius or eccentricity of which can be varied in a manner which will be hereinafter explained. The driven shaft 2 is coaxial with the driving shaft 1 and terminates in a plate 5 arranged opposite to the plate 3. Between these two plates is arranged a mechanism which transmits the movement of the crank pin 4 to the plate 5 with a velocity proportional to the eccentricity of this crank pin, that is to say, to the diameter of the circle that is being described by the crank pin.

In the form of construction illustrated in Figures 1 and 3, the mechanism adopted for transmitting motion from the plate 3, which is united, to the driving shaft 1, to the plate 5, which is united with the driven shaft 2, is somewhat different. The plate 5 carries a crank pin 4 of variable eccentricity. Upon this crank pin can revolve freely a disc 24, provided with radial grooves 25, in which slide cylindrical guide members 30, which carry on both sides of the disc 24, two pawls each, 31 and 32. The pawls 32 are lodged in a groove 15 in the plate 5 secured to the driven shaft, which groove again has one of its walls toothed, and the pawls 31 are lodged in a similar groove 33 in a ring 34 secured to the casing 28 of the mechanism. When the crank 4 revolves, the grooved disc 24 follows the movements of the crank pin, and the pawls 31 and 32 dragged along by the grooves 25 of this disc, are displaced inside the passages 33 and 15, with which, the pawls 31 bearing in the teeth of the fixed groove 33, the other pawls 32, upon engaging in the teeth of the groove 15, constrain this groove, and therefore the plate 5 and the driven shaft 2, to revolve. In this construction the angular velocity of the plate 5 is proportional to the displacement of the pawls 32, and therefore to the eccentricity of the crank pin 4.

The case 28, 29 of the mechanism is of a form suitable for permitting the free movement of the disc 24, and is provided as in the previous case, with ball-bearings 6, 7 to facilitate the movement of the rotatable members contained within it.

As will be understood, it is not indispensable that the pawls 31 and 32 should be arranged in the manner illustrated by way of example in the drawings, but they may be of any suitable form and construction. Thus for example they may be constituted, in a manner already known for other purposes, by a simple ball or roller, which remains jammed between the circular surface of the channel and an inclined or eccentric surface on a member guided in the channel.

In Figures 3 and 4 is illustrated a mechanism for varying the eccentricity of the crank pin 4, so arranged that this eccentricity can be varied either by hand or automatically, due to the actual resistance encountered by the driven shaft in revolving. As will be seen from these figures the disc or plate 3, which carries the eccentric crank pin 4, has a groove in a diametral direction, in which slides a guide member 35, which is the member to which the crank pin 4 is fixed. This guide member 35 is displaced in the diametral groove of the plate 3 by any convenient means. For example the member 35 may have an extension 36 cut in the form of a toothed rack, with which there constantly meshes a pinion or a ring of teeth 37 arranged in a sleeve 38 in such a way that by rotating the sleeve 38 the pinion 37 displaces the rack 36 and alters the eccentricity of the crank pin 4.

In the simplest arrangement the plate 3 is invariably united to the extremity of the driving shaft 1, and by providing means (for example a handle 54) for rotating the sleeve 38 by hand, with the pinion 37, the change of speed is in each case regulated.

In the arrangement illustrated in Figure 3, in order that this change-speed gear may be automatic, the driving shaft 1 is not secured directly to the plate 3, as has hitherto been assumed, but is integral or virtually integral with a box 41, 42, which, by means of a spiral spring 43, is coupled to the inner driving shaft 44, which is the one which in its turn is secured by means of a plate 45 to the plate or disc 3, which carries the eccentric crank pin.

The half 42 of the box, which encloses the spring is extended around the inner driving shaft 44 forming a sleeve 46, provided with helical grooves 47, and around this sleeve 46 is arranged the sleeve 38, which presents two straight grooves 48. In a similar manner the casing 8 has an extension forming a box 49, which surrounds this mechanism, and which has two helical grooves 50 cut in its internal surface, and within this casing 49 there is another sleeve 51, which bears two straight grooves 52, and which is furthermore extended outside the casing 49, forming a disc 53, with one or more handles 54 to enable it to be actuated by hand.

In combination with these straight and helical grooves there are interposed between the sleeves 38 and 51 two concentric rings 55 and 56, coupled to one another in such a manner that they can rotate independently of one another, but that any movement of axial displacement has to be common to both.

The ring 55 is provided with projecting pegs 57, which enter simultaneously into the grooves 52 in the sleeve 51, and into the grooves 50 in the outer box 49, and similarly the inner ring 56 has projecting pegs 58, which simultaneously enter the straight grooves 48 of the sleeve 38 and the helical grooves 47 of the sleeve 46.

As a result of this arrangement, upon moving the disc 53 by hand by means of the handles 54, the rotary movement of the sleeve 51 is transmitted to the sleeve 38, which carries the toothed pinion 37, and the latter, by operating upon the rack 36, varies the eccentricity of the crank pin 4.

For the rest, when the driven shaft encounters a greater resistance in its movement, the resilient coupling 43 causes a relative displacement to be produced between the external casing 42, with its sleeve 46, and the inner driving shaft 44, which determines a movement of rotation of the pinion 37 in the direction corresponding to a diminution of the eccentricity of the crank pin 4, thus diminishing the speed of the driven shaft. Conversely, when the force that the driven shaft has to exert diminishes, the eccentricity of the crank pin is increased, and therefore, the speed of the driven shaft is also increased.

In order to obviate the eccentricity of the crank pin producing vibrations as the driving shaft revolves, there may be provided in the disc 3 a balancing mass combined with the mechanism that varies the eccentricity of the crank pin, in such a manner that this balancing mass is displaced simultaneously with the crank pin, but in the opposite direction, this mass balancing the forces developed as the eccentric crank pin revolves.

By the mechanism of this invention it therefore becomes possible to transmit motion from one shaft to another with any speed ratio that may be desired and without abrupt transitions in the speed ratio. By providing the automatic mechanism it is possible for this change of speed to be produced automatically without the necessity of any care on the part of the operator or driver, and always in relation to the resistance encountered by the driven shaft or to the force that has to be exerted thereby.

I claim:—

1. A change speed gear having in combination, a frame and mechanism mounted in said frame comprising a driving shaft provided on its end with a crank pin of varying eccentricity or radius, a driven shaft situated in axial alignment with the driving shaft and provided with a plate which remains in front of the crank pin of the driving shaft, a disk revolving freely on the crank pin of the driving shaft, the said disk receiving a circular displacement movement on the said crank pin turning, radial slots on the said disk, sliding pieces which can slide in the said radial slots and means cooperating with the said sliding pieces for driving the plate of the driven shaft with a speed proportional to the displacement of the said disk by the action of the said crank pin.

2. In a change speed gear as claimed in claim 1, in which the means cooperating with the sliding pieces for driving the plate of the driven shaft comprises a pair of opposed pawls carried by each of said sliding pieces, the plate joined to the driven shaft, having a circular slot therein, a fixed part of the frame of the mechanism having a second circular slot therein, the said two circular slots being opposite each other, and the opposite pawls carried by the said sliding pieces moving respectively in the said circular slots and means in the said circular slots for transmitting to the plate fixed to the driven shaft the movement of the pawls in the form of a rotating movement with a speed proportional to the radius or eccentricity of the crank pin of the driving shaft.

3. In a change speed gear as claimed in claim 1, a plate coupled to the driving shaft provided with a sliding piece which can move radially on the said plate, the said sliding piece carrying the eccentric crank pin and means for moving by hand the said sliding piece from the outside of the mechanism, independently of the rotation of the driving shaft.

4. In a change speed gear as claimed in claim 1, a plate mounted freely in axial alignment with the driving shaft the said plate carrying a sliding piece radially movable provided with the eccentric crank pin, a spring connecting the driving shaft with the said plate in order to resiliently transmit to the plate the rotation from the driving shaft, allowing of an angular displacement between both proportionate to the resistance encountered by the driven shaft in its movement and means operated by the said angular displacement for producing a radial displacement of the crank pin, thus changing automatically the speed of the driven shaft in relation to the resistance encountered by this driven shaft in its movement.

JOSE VISCASILLAS.